Patented June 23, 1936

2,045,513

UNITED STATES PATENT OFFICE 2,045,513

PROCESS FOR SEPARATING VOLATILE ORGANIC COMPOUNDS FROM AQUEOUS SOLUTIONS

Pierre Berthélemy and François Baylocq, Paris, France, assignors to Société Anonyme Française said: "Les Produits Chimiques Purs," Paris, France No Drawing. Application January 7, 1936, Serial No. 57,888. In France June 28, 1930

4 Claims. (Cl. 260—122)

This invention relates to a process for separating volatile organic compounds from aqueous solutions thereof.

It is an object of the invention to directly separate, in a high concentration and pure state, such organic compounds from their aqueous solutions.

In carrying out the process, an aqueous solution of the organic compound is treated with an extracting material which forms a complex body or molecular association with the organic compound; the molecular association is not readily miscible with water and can be separated from the major portion of the water by decantation. The molecular association formed by the extracting agent and the organic compound may be decomposed or dissociated by heating it; by this procedure the organic compound may be liberated from the association and distilled and collected.

For convenience the complex body formed by the extracting agent and organic compound is being referred to as a "molecular association." However this terminology is not to be understood as limiting the process to any particular theory as to the nature of the complex formed.

The molecular association will also contain a certain amount of water which is not separated by the decantation. This will distill at the time heat is applied to dissociate the molecular association. According to processes heretofore known, the water contained in the molecular association has been permitted to be carried over with the organic compound during a single distillation operation, with the result that the compound is not obtained in a highly concentrated form even though the distillate is separated into fractions.

We have discovered that if the molecular association is heated at or above the boiling temperature of water, but below the temperature at which the molecular association decomposes, substantially all of the water can be eliminated from the association before the latter is dissociated. After substantially all of the water has been eliminated in this manner, the molecular association may be then heated to the temperature at which it decomposes and the organic compound distilled over and collected in a pure and highly concentrated form.

It is a further object of the invention to obtain organic compounds in a high concentration by eliminating substantially all of the water from the molecular association prior to dissociating the association. In accordance with the process, concentrations of organic compounds of 95% or higher may be obtained. It is concentrations of this order that are referred to hereinafter as high concentrations.

The process may be employed to treat aqueous solutions of volatile organic compounds such as water soluble hydrocarbons, alcohols, aldehydes, ketones, acids, ethers, esters, etc. in order to separate the compound in a high concentration.

The preferred extracting agent is one of the phenols, such as phenol or cresol or a mixture thereof.

The process may be applied to the recovery, in a highly concentrated form, of the acetic acid contained in the residuary waters resulting from the manufacture of acetates of cellulose, and to a similar recovery of the homologues of acetic acid, such as butyric acid and other fatty acids, obtained by fermentation or other processes.

As illustrative of the process, it will be described as applied to the recovery of acetic acid from the residuary water resulting from the manufacture of acetate of cellulose which may have an acid content of about 30%. One thousand liters of residuary water is mixed with 2500 liters of the extracting agent, for example, phenol or cresol, or a mixture thereof, and stirred intimately at room temperature for two or three minutes. The molecular association formed by the acetic acid and the phenol is separated from the water by decantation; it will be found that almost all of the acetic acid will have been extracted from the residuary water.

If it is desired, the decanted water may be again treated with the extracting agent in order to extract more completely the acid remaining in the decanted water. The extracting agent with the molecular association, after having been decanted may be utilized again to treat new portions of residuary water having an acid content greater than that contained in the extracting agent, and the operation may be repeated any desired number of times in order that the concentration of the molecular association in the extracting agent may be as high as possible. By means of this process a systematic exhaustion of the acidity of the residuary water may be obtained by employing an extracting agent having a molecular association content which is lower than the acidity of the residuary water.

The decanted extracting agent with the molecular association is then heated at or above the boiling point of water (100° C.), but at a temperature below that at which the molecular association decomposes, in order to eliminate substantially all of the water which remains in the molecular association and which was not separated by decantation. In this manner substantially all of the water is removed from the association. The amount of water remaining is usually less than 5% (based on the acid content in the association).

If any acetic acid is liberated from the association during the removal of the water, it may be recovered by subjecting the water to a treatment with a further amount of the extracting agent.

After the water has been removed, the temperature is raised to the decomposition temperature of the molecular association and the acetic acid is liberated from the association and distilled. It may be obtained in a pure form and in a high concentration, i. e., a concentration of at least 95%.

At the conclusion of the decomposition, the extracting agent remaining is practically free from acetic acid and may be used again by bringing it anew into contact with fresh residuary waters. It will be apparent that the extracting agent completes a closed cycle without appreciable loss of the same and it is obvious that the operation is highly economical.

By means of the present process, it is possible to recover directly and immediately, in a state of high concentration, practically the entire quantity of acid contained in residuary waters, of the type above mentioned and similar types, without the necessity of transforming the acid into an alkaline or alkaline earth acetate.

The extraction of other fatty acids may be effected in a similar manner irrespective of the concentration of the acid in the aqueous solution. However, inasmuch as the solubility of higher homologues of acetic acid decreases in proportion as their molecular weight increases, and their boiling point rises as their molecular weight increases, it will be obvious that the extraction of the higher homologues from their aqueous solutions by means of an extracting agent and their separation from the association will be easier and even higher concentrations than above indicated may be obtained.

In the separation of butyric acid from its aqueous solution, the solution is mixed with an extracting agent, such as phenol or cresol. The acid and the extracting agent form a molecular association immediately. The extracting agent with the molecular association is decanted and is then heated to remove substantially all of the water which may be retained with the association after the decanting. The temperature is then increased to the decomposition point of the molecular association and butyric acid in a very pure and high state of concentration is obtained. The extracting agent remains intact.

When the invention is practiced on an industrial scale by a continuous process it is advisable to employ separate stages for the fractionation, one for the complete dehydration of the association and the other for the decomposition of the association. For example, separate distillation or condensing columns for each fraction may be employed.

If the aqueous solution contains more than one organic compound, both of these may be separated. The different organic compounds will form different molecular associations or complexes with the phenol, and the different complexes will have different decomposition temperatures. After the extracting agent with the molecular associations is decanted and heated to a temperature to eliminate substantially all of the water therefrom, the temperature is raised to that of the decomposition point of the molecular association having the lowest decomposition temperature, at which time the organic compound in the molecular association will be recovered in a pure state in a high concentration. The temperature is then increased to the decomposition point of the additional molecular association, and in a similar manner the organic compound present in this association is obtained in a pure state of high concentration.

The invention may be utilized in processes in which the mixture of the organic compound and the water is in vaporous form when treated with the phenol. The reference hereinafter to the aqueous solution containing an organic compound is intended to refer to a mixture of the compound with water in either the vaporous or liquid form.

It will be obvious that it is within the skill of the chemist, once the principles of the present invention have been made known to him, to apply the invention in recovering many compounds other than those hereinbefore specifically mentioned from aqueous solutions and admixtures thereof with other similarly recoverable compounds and water, and that various modifications in the procedure employed may be made, all without departing from the invention. It is to be understood that such compounds and variations of the procedure are to be deemed to be the equivalent of those herein specifically set forth and that the claims appended hereto are to be deemed as covering the full range of such patentable equivalents of the compounds therein specifically recited.

This application is a continuation in part of our application Serial No. 547,180, filed June 26, 1931.

What we claim is:

1. The process of producing in a high concentration an acid of the class consisting of acetic acid and its homologues, from an aqueous solution containing the same, which comprises adding to said solution a phenol to form a molecular association stable in the presence of and immiscible in water, separating said molecular association from the bulk of the water, heating the association at a temperature below its decomposition temperature but at or above the boiling point of water and maintaining said temperature until no more than about 5% of water, based on the acid in the association, is retained by or otherwise present with the association, and then heating the association to its decomposition temperature to liberate the acid from the association in a highly concentrated and pure state.

2. The method of producing acetic acid in a high concentration from an aqueous solution containing the same, which comprises adding to said solution a phenol to form a molecular association stable in the presence of and immiscible in water, separating said molecular association from the bulk of the water, heating the association at a temperature below its decomposition temperature but at or above the boiling point of water and maintaining said temperature until no more than about 5% of water, based on the acid in the association, is retained by or otherwise present with the association, and then heating the association to its decomposition temperature to liberate the acid from the association in a highly concentrated and pure state.

3. The process of producing in a high concentration an acid of the class consisting of acetic acid and its homologues, from an aqueous solution containing the same, which comprises adding to said solution a phenol to form a molecular association stable in the presence of and immiscible in water, separating said molecular association from the bulk of the water, heating the association at a temperature below its decomposition temperature but at or above the boiling point of water and maintaining said temperature until no more than about 5% of water, based on the acid in the association, is retained by or otherwise present with the association, and then heating the association to its decomposition temperature to liberate the acid from the association in a highly concentrated and pure state, the elimination of the water and the decomposition of the molecular association being carried out respectively in different fractionating columns.

4. The method of producing acetic acid in a high concentration from an aqueous solution containing the same, which comprises adding to said solution a phenol to form a molecular association stable in the presence of and immiscible in water, separating said molecular association from the bulk of the water, heating the association at a temperature below its decomposition temperature but at or above the boiling point of water and maintaining said temperature until no more than about 5% of water, based on the acid in the association, is retained by or otherwise present with the association, and then heating the association to its decomposition temperature to liberate the acid from the association in a highly concentrated and pure state, the elimination of the water and the decomposition of the molecular association being carried out respectively in different fractionating columns.

PERRE BERTHÉLEMY.
FRANÇOIS BAYLOCQ.